(No Model.)
J. E. ARTHUR.
NUT AND BOLT LOCK.
No. 479,131. Patented July 19, 1892.
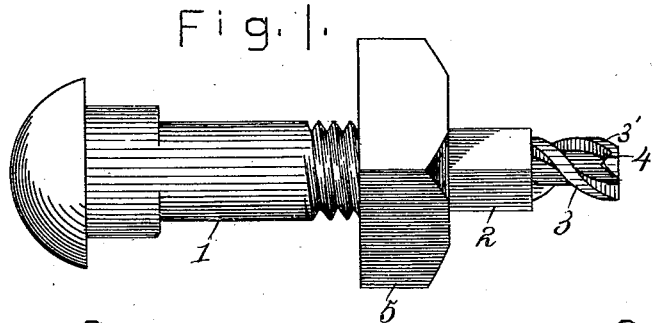
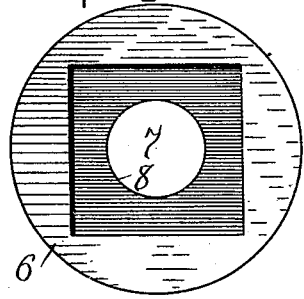
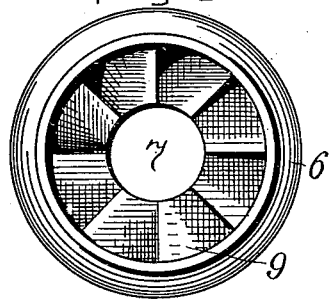
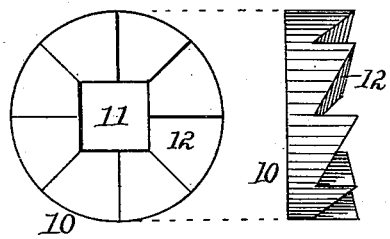
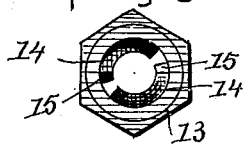
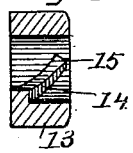
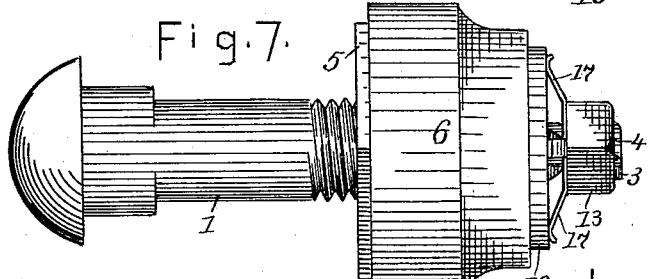
ATTEST
Helen Graham
William Graham
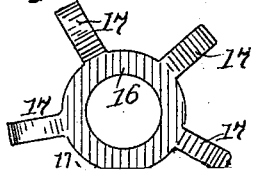
INVENTOR
John E. Arthur
by his attorney
L. P. Graham

UNITED STATES PATENT OFFICE.

JOHN E. ARTHUR, OF CLINTON, ILLINOIS.

NUT AND BOLT LOCK.

SPECIFICATION forming part of Letters Patent No. 479,131, dated July 19, 1892.

Application filed March 19, 1892. Serial No. 425,579. (No model.)

*To all whom it may concern:*

Be it known that I, JOHN E. ARTHUR, of Clinton, in the county of De Witt and State of Illinois, have invented certain new and useful Improvements in Nut and Bolt Locks, of which the following is a specification.

This invention is designed to lock nuts and bolts together. It is to some extent an automatic tightener, as it is adapted to tighten nuts sufficiently to compensate for ordinary wear or slight shrinkage. It is applicable to all the uses of bolts and analogous devices—as, for instance, the keys of strap-heads of engines; and it consists in the details of construction and combinations of parts hereinafter set forth and claimed.

In the drawings accompanying and forming a part of this specification, Figure 1 represents a bolt constructed in accordance with my invention and provided with an ordinary nut. Fig. 2 is an inner view of a nut-cap. Fig. 3 is an outer view of the same. Fig. 4 shows in face and side view a washer adapted to take up wear in the nut and bolt. Fig. 5 is a face view of a locking-nut. Fig. 6 is a section through such nut. Fig. 7 shows a bolt and nut as they appear when locked after the manner of my invention. Fig. 8 is a face view of an elastic washer, which forms an essential part of my device. Fig. 9 is a diagram illustrating the operation of the locking-nut.

The bolt 1 is threaded in the customary manner. It has the part 2 rectangular in cross-section and extended beyond the nut, and it also has a further extension threaded, as seen at 3. The lock-threads 3' have unusually quick pitch. The spaces at the end of the bolt are of the usual proportion; but they are widened back from the end and provided with V-shaped recesses 4. The nut 5 is of the ordinary construction, and is of course threaded to conform to the threads of the bolt. The cap 6 has the circular hole 7. It is recessed at 8 to fit over nut 5, and it has a set of inclines 9, pitched reversely to the thread of the bolt. The washer 10 has a rectangular hole 11, adapted to admit the rectangular portion 2 of the bolt, and it has a set of inclines 12, corresponding to the inclines of the cap. The lock-nut 13 has threads 14, each of which has a V-shaped termination 15, adapted to engage a corresponding recess in the lock-thread of the bolt. The washer 16 has spring-extensions 17, which bear against the face of tightening-washer 10, as seen in Fig. 7. The nut 5 is screwed to position, as seen in Fig. 1, the cap is set over the nut, the tightening-washer is placed on the rectangular part of the bolt, with the outer part or noses of its inclines bearing against the noses of the inclines of the cap, the spring-washer is placed in position, as shown, and the lock-nut is screwed onto the lock-threads of the bolt. The spring-washer resists the placing of the nut on the lock-threads; but the nut is forced on against such pressure in the direction indicated by arrow X in Fig. 9, and when the threads of the nut are in suitable positions the spring moves the nut in the direction shown by arrow Y and causes the V-shaped ends of such threads to enter the V-shaped grooves or recesses 4 and lock all the parts together. The spring is constantly exerting its elastic force against the lock-nut and the tightening-washer. The inclines tend to cause rotation in one of the parts in contact. The washer 10 cannot rotate because of its rectangular bearing on the rectangular part of the bolt, and consequently the nut has a continuously-acting force, causing it to tighten as fast as wear will permit, the extent of the motion being of course limited by the length of the inclines. The inclination of the notches in the locking-threads is about the same as the pitch of the threads, so that it takes about the same effort to start the nut off the bolt that it does to attach it; but after the notches are passed the resistance is overcome and the nut comes off easily. The lock-thread on the bolt, the lock-nut adapted to the thread, and the spring-washer will by themselves prevent a nut from becoming detached from a bolt; but they will not prevent it from turning, and they have no tendency to tighten it. If washer 10 were provided with teeth turned in the opposite direction from its shown inclines and were used between the spring-washer and nut 5, with its teeth in contact with the nut, the nut would be held from turning, but not be tightened as it became loose. As shown, the set of the nut on the bolt is supposed to be always the same, and the lock-threads are each provided with but one recess. Additional recesses may, however, be provided when the locking-nut needs more adjustment.

The form of the spring-washer may be varied without affecting the principle of my invention, as the essential thing is elasticity, regardless of how it is obtained.

I claim—

In nut and bolt locks, the combination of a nut 5, and a bolt 1, having the usual threads, the rectangular part 2, and the extension 3, having lock-threads provided with recesses 4, the nut 5, adapted to the usual threads of the bolt, cap 6, having recess 8 and inclines 9, washer 10, having inclines 12, conforming to the inclines of the cap and also having a rectangular hole fitting part 2 of the bolt, spring-washer 16, and lock-nut 13, having threads adapted to engage the recesses 4 of the bolt.

In testimony whereof I sign my name in the presence of two subscribing witnesses.

JOHN E. ARTHUR.

Attest:
J. H. SMITH,
STEPHEN K. CARTER.